United States Patent [19]

Klimo

[11] 4,032,825
[45] June 28, 1977

[54] COMMUTATING OSCILLATOR AND CURRENT-LIMITER FOR SOLID STATE SWITCHING CIRCUITS

[75] Inventor: Robert G. Klimo, Parma, Ohio

[73] Assignee: Cleveland Machine Controls, Inc., Cleveland, Ohio

[22] Filed: Oct. 28, 1975

[21] Appl. No.: 626,501

[52] U.S. Cl. .............................. 318/139; 318/341; 318/373
[51] Int. Cl.² ........................................ H02P 5/16
[58] Field of Search .................. 318/139, 341, 373

[56] References Cited

UNITED STATES PATENTS

| | | | |
|---|---|---|---|
| 3,697,845 | 10/1972 | Soffer et al. | 318/341 |
| 3,843,912 | 10/1974 | Anderson | 318/373 X |
| 3,875,486 | 4/1975 | Barton | 318/341 |
| 3,938,015 | 2/1976 | Beebe | 318/139 |
| 3,944,900 | 3/1976 | Rohsler | 318/139 X |
| 3,982,161 | 9/1976 | Grace | 318/341 X |

*Primary Examiner*—Robert K. Schaefer
*Assistant Examiner*—W. E. Duncanson, Jr.
*Attorney, Agent, or Firm*—Phillips, Moore, Weissenberger, Lempio & Majestic

[57] ABSTRACT

A circuit for use in a silicon controlled rectifier (SCR) control for direct current powered loads wherein the commutating voltage on the commutating capacitor is used to generate a gate pulse for the commutating SCR to thereby turn the main SCR off at a fixed and predetermined time after it has been turned on. The commutating voltage in the commutating capacitor is also monitored during charging thereof and the gate pulse for the commutating SCR is generated prior to the predetermined time in case the peak current through the main SCR reaches a predetermined excessive value. The gate pulse is also generated prior to the predetermined time during plugging or low-speed operation of motors.

20 Claims, 1 Drawing Figure

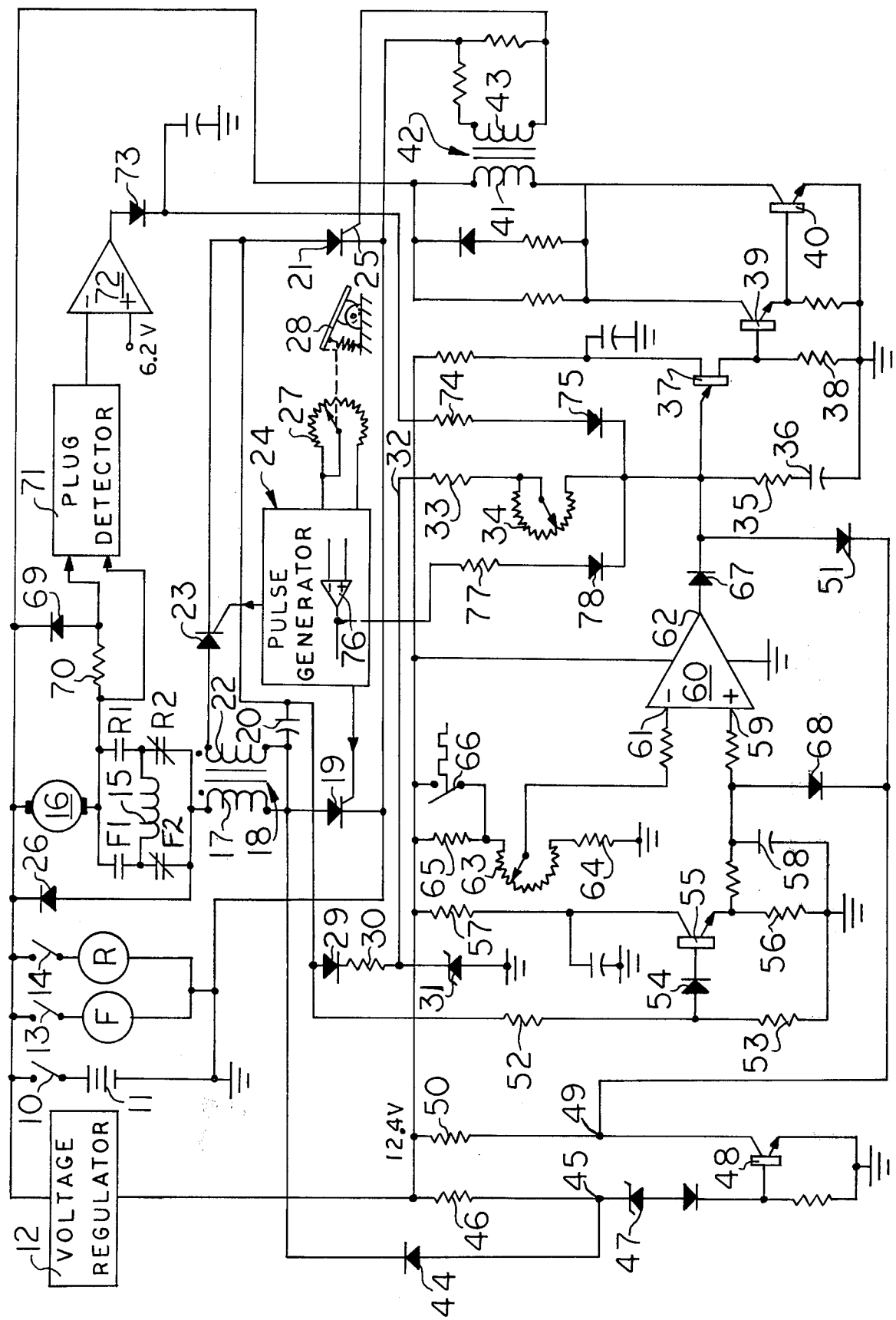

COMMUTATING OSCILLATOR AND CURRENT-LIMITER FOR SOLID STATE SWITCHING CIRCUITS

BACKGROUND OF THE INVENTION

This invention is directed to a control circuit utilizing silicon controlled rectifiers (SCR's) for controlling the operation of a series motor powered from a direct current source.

It is well known that the direct current supplied to a load, such as a direct current motor, from a power source, such as a battery, may be selectively varied by controlling the average power supplied to the load, and that a solid state SCR can be used as a switching device to repeatedly connect and disconnect the battery to and from the load. The power supplied to the load is determined by the ratio between the time the SCR is turned on and the time the SCR is turned off.

Turning the SCR repeatedly on and off will allow a series of pulses of current to flow through the load, the frequency of the pulses being determined by the number of times the SCR is turned on per unit time and the duration of width of the pulses being determined by the length of time that the SCR remains on before it is turned off. If the pulse width remains constant during normal operation, as it is in the present invention, the ratio of on-time to off-time will vary directly as the frequency of the pulses. As the pulse frequency increases, the off-time between the time the SCR is turned off and the time it is turned back on will decrease, and more power will be delivered to the load.

Typically, SCR control systems include a main SCR which is connected in series with the load, and a pulse generator to supply a chain of gate pulses to turn the main SCR on repeatedly. A commutating capacitor is provided which will charge in a commutating direction through a charging SCR. The charging of the commutating capacitor is typically done when the main SCR is conducting. At the appropriate time a commutating SCR is turned on to connect the charged capacitor across the main SCR and divert the current therefrom so that the main SCR is reversely biased and will turn off.

SUMMARY OF THE INVENTION

The present invention provides a circuit to gate the commutating SCR on, and thereby commutate the main SCR at a fixed and predetermined time after the main SCR is gated on.

This is accomplished by means of a commutation oscillator having a timing circuit that is reset when the main SCR is not conducting and which is powered by a regulated voltage derived from the commutating charge on the commutating capacitor. Thus, every time the main SCR conducts and the commutating capacitor is charged, a pulse will be generated after a fixed time delay to gate the commutating SCR on so that the main SCR is turned off.

In a plugging operation, wherein the load is a motor and the motor is acting as a generator to brake the vehicle propelled thereby, the circuit of the present invention will automatically reduce the time of the timing circuit so that the pulse to the commutating SCR will occur sooner. This will reduce the on-time of the main SCR during plugging to a shorter, but constant, time so that a finer degree of control can be achieved during plugging.

Also, the circuit of the present invention will automatically reduce the time of the timing circuit so that the pulse to the commutating SCR will occur sooner in the event of low-speed motor operation.

In addition, the present circuit senses the magnitude of commutating voltage on the commutating capacitor, which is directly related to the peak current through the main SCR. If the magnitude of the voltage on the capacitor exceeds a predetermined value, the commutating SCR is gated on earlier than normal so that the main SCR is commutated before the peak current therethrough can reach an excessive and potentially destructive amount.

Other objects and advantages will be apparent in the course of the following detailed description.

BRIEF DESCRIPTION OF THE DRAWING

The single FIGURE is a schematic diagram of an SCR control system for a series motor powered from a direct current source utilizing a commutation oscillator and current limit circuit in accordance with the present invention.

DESCRIPTION OF THE PREFERRED EMBODIMENT

Referring now to the drawing, wherein is shown a preferred embodiment of the invention, a main switch 10 enables a source of direct current, e.g., battery 11, to be connected to the circuit. A voltage regulator 12 supplies a regulated 12.4 volts to the control circuits. Direction switches 13 and 14 are provided to alternatively energize one of the forward (F) or reverse(R) relay coils, to connect the field winding 15 in series with the armature 16 by means of the forward contacts F1 and F2 or the reverse contacts R1 and R2. With switch 10 and one of the switches 13 or 14 closed, a current path is provided from the battery through the armature and field winding, the primary 17 of pulse transformer 18 and the main silicon controlled rectifier (SCR) 19.

A commutating capacitor 20 is connected in series with a commutating SCR 21, the capacitor 20 and SCR 21 being in parallel with the main SCR 19. A charging path for the capacitor 20 is provided by the loop comprised of capacitor 20, the secondary 22 of pulse transformer 18 and the charging SCR 23.

In operation, pulses from pulse generator 24 are applied simultaneously to the gates of the main and charging SCR's 19 and 23. With the main SCR gated on, current will flow through the motor and the primary of pulse transformer 18. Current flow will be induced in the secondary 22 and will flow through SCR 23 to charge the commutating capacitor 20 so that its right plate is charged positively relative to its left plate. When the capacitor is fully charged SCR 23 will commutate.

Subsequently, by means to be described hereinafter, a pulse is applied to the gate 25 of the commutating SCR 21 to turn it on and connect the commutating capacitor 20 across the main SCR 19 so that the charge on the capacitor 20 will commutate the main SCR. Current through the motor is maintained while the main SCR is off by means of the flyback diode 26.

Gate pulses from the pulse generator 24 will then be applied to the main and charging SCR's to start another cycle of operation. Thus, if the main SCR is commutated at a constant time after it is gated on, the power delivered to the motor will vary in accordance with the pulse rate of pulse generator 24. The pulse rate is determined by the setting of potentiometer 27 which is conveniently controlled by the operator by means of a foot-operated accelerator pedal 28.

The circuit for controlling the commutation SCR 21 will now be described. As the commutation capacitor 20 charges through SCR 23, its right plate will go positive relative to ground and will cause current to flow through diode 29 and resistor 30 to the cathode of zener diode 31 to develop a regulated potential, e.g., +12 volts, on line 32.

This regulated voltage on line 32 causes current to flow through resistor 33 and variable resistor 34 (pulse width adjustment) into the timing network of resistor 35 and timing capacitor 36. As capacitor 36 charges, it will in due course turn on unijunction transistor 37. Capacitor 36 will discharge through transistor 37 and resistor 38, and the voltage developed across resistor 38 will cause the Darlington-connected transistor 39 and 40 to conduct. Conduction through transistor 40 causes current to flow through the primary 41 of pulse transformer 42, inducing a voltage in the secondary 43 which is applied to the gate and cathode of the commutating SCR 21 to gate that SCR on.

The timing capacitor 36 is clamped to ground potential during the time that the main SCR 19 is off by means of the following circuit. When the main SCR is on, its anode will be essentially at ground potential. The anode is connected by diode 44 to the junction 45 of resistor 46 and zener diode 47. When the main SCR is conducting, junction 45 will be at essentially ground potential which prevents transistor 48 from conducting. The junction 49 between transistor 48 and resistor 50 accordingly is high when the main SCR is on. Junction 49 is coupled by diode 51 to the base of unijunction transistor 37, but the polarity of diode 51 prevents a high level at junction 49 from affecting operation of the commutation oscillator.

When the main SCR is commutated, its anode potential will rise, but this rise in potential is blocked by diode 44. The base of transistor 48 is biased positively by the voltage of zener diode 47 causing transistor 48 to turn on and ground junction 49 through its emitter-collector path. This ground potential appears at the base of unijunction transistor 37 through diode 51 and thus clamps the upper plate of timing capacitor 36 to ground potential.

Thus, during the time the main SCR is off, the commutation oscillator is disabled and the timing capacitor 36 is reset to ground potential. The pulse to gate on the commutating SCR 21 is generated in response to the conduction of the main SCR and the charging of the commutating capacitor 20. The pulse will be delayed for a time dependent upon the charging path of timing capacitor 36 and this time period can be adjusted by variable resistor 34 as desired. Once adjusted, the on-time of the main SCR in each cycle of normal operation will be constant regardless of the pulse rate of pulse generator 24, except in the following instances wherein the on-time of the main SCR is to be shortened.

The present circuit also enables the peak current through the main SCR to be limited to prevent damage thereto.

The voltage that the commutating capacitor 20 charges to during conduction of the main SCR is proportional to the current through the main SCR and the primary of pulse transformer 18. The full voltage on the commutating capacitor is applied to the resistors 52 and 53 is scaled down by the emitter follower action of diode 54, transistor 55 and resistors 56 and 57. Capacitor 58 thus charges to a potential level proportional to the voltage on the commutating capacitor 20. The capacitor 58 is connected to the non-inverting input terminal 59 of comparator 60. Comparator 60 is a conventional integrated circuit operational amplifier connected as a differential-input comparator. When the voltage level on the non-inverting terminal 59 is lower than the voltage level on the inverting input terminal 61, the output 62 will be low. If the voltage level on the non-inverting terminal is higher than the level on the inverting terminal, the output 62 will go high. The inverting terminal 61 is connected to the wiper of potentiometer 63 which is in series with resistors 64 and 65 to provide a reference level voltage to the inverting input. This level may be adjusted by variable resistor 63 (current limit adjustment). Resistor 65 is normally shorted by the normally closed thermal switch 66. This switch is operated to open position in a conventional manner in response to overheating of the main SCR. If and when switch 66 opens, the effect will be to lower the potential level at the inverting input to comparator 60.

Thus, comparator 60 will continually monitor and compare the variable voltage at its non-inverting input (which voltage is proportional to the current through the main SCR) with the fixed reference level at its inverting input. As long as the main SCR current is below a predetermined level, the output of comparator 60 will be low and diode 67 will be back biased so that normal operation of timing capacitor 36 is not affected. If the current through the main SCR is excessive, the charge on the commutating capacitor will seek to increase accordingly and the level of the signal at the non-inverting input of comparator 60 will go above the reference signal at the inverting input thereof. The output of comparator 60 will then go high and this high voltage is coupled by diode 67 to the base of the unijunction transistor 37 and to capacitor 36. Charging current can now flow from the output of comparator 60 to the charging capacitor 36 (in an amount dependent upon the internal resistance of comparator 60) in addition to the charging current flowing to capacitor 36 through resistors 33 and 34. This increase in charging current causes capacitor 36 to charge more rapidly to the voltage required to turn transistor 37 on and generate the pulse to gate on the commutating SCR 21 and thereby commutate the main SCR 19. As a result, if, and as soon as, the voltage on the commutating capacitor exceeds a predetermined value, the time period of the timing circuit for the commutating SCR pulse generator is reduced and the main SCR is commutated prior to the predetermined time of normal operation.

Thus, it is the peak current through the main SCR that is limited — not the average current. By thus safeguarding the main SCR against excessive peak current, the present current limit circuit enables it to control the probable cause of erratic control operation, namely, excessive anode current in the main SCR. If the anode current has an instantaneous value in excess of the ability of the commutation circuit to commutate, commutation will fail and the main SCR will stay on. That is, if not limited, the anode current could reach a level above that which can be diverted to the commutation capacitor during its discharge period to permit the main SCR to recover its forward blocking characteristic and shut off. This situation is prevented in the present circuit since the circuit causes commutation to occur before the anode current exceeds the capability of the commutation circuit.

The current limit circuit also operates to safe-guard the system if the main SCR 19 overheats. If it does, thermal switch 66 opens, lowering the reference voltage level applied to the inverting input of comparator 60. The circuit will thus cause commutation of the main SCR at a lower current limit level, thus reducing the maximum power delivered there-through to the motor. When the main SCR cools, thermal switch 66 will close, restoring the circuit to normal current limiting operation.

During the time that the main SCR is off, the current limit capacitor 58 will be clamped to ground potential by diode 68, in the same manner that the timing capacitor 36 is clamped to ground potential by transistor 48.

It is desirable to provide substantially narrower current pulses through the main SCR 19 when the motor is plugging, i.e., when the motor is turning and the field is connected so that the current through the field is in a direction opposite to that which would cause the motor to rotate in the same direction. For example, suppose the forward switch 13 has been closed and the motor is propelling the vehicle forwardly. If the forward switch 13 is opened and the reverse switch 14 is closed, the contacts F1 and R2 will open and the contacts F2 and R1 will close, reversing the connection of the field winding 15 to the armature 16. The reversal of the field winding will cause the polarity of the armature voltage to reverse so that current, usually referred to as plug current, will flow through the loop comprising the plug diode 69, resistor 70 and armature 16, developing a voltage across resistor 70 which is applied to the input of the plug detector circuit 71. This circuit, by means not shown, will inhibit the pulse generator 24 from generating pulses to gate the main SCR 19 on until the plug current decreases to a desired value. At such time, the plug detector circuit will allow the pulse generator 24 to start again. Preferably the plug detector circuit is as shown in the application of Robert G. Klimo and Robert W. Artrip, entitled "Plugging Control", Ser. No. 626,503, filed concurrently herewith and assigned to the assignee of the present application, the disclosure of which is incorporated herein by reference.

The plug detector circuit 71 will also develop an output which is applied to comparator 72 so that the normally low output of the comparator will go to a high level whenever plug current is present. The high output of comparator 72 thus causes current to flow through diode 73, resistor 74 and diode 75 and then through resistor 35 and timing capacitor 36. As a result, whenever the motor is plugging, an additional charge path is provided for the timing capacitor 36 through resistor 74. The increase is current through the timing capacitor causes it to charge more rapidly and turn on the unijunction transistor 37 earlier than when the motor is not plugging. Thus, when plugging, the pulse to gate the commutating SCR 21 on occurs earlier and the main SCR 19 is commutated earlier. For the same pulse rate of the pulse generator 24, the power supplied to the motor through the main SCR 19 will be lowered during plugging, as is desired, because the current pulses will be shorter in duration.

It is also desirable to provide narrower current pulses through the main SCR 19 when the vehicle is operating at "creep" speed, i.e., when pulse generator 24 is delivering gate pulses to the main SCR at a very low frequency, so that a smoother creep speed is provided. In order to accomplish such a result with the present invention, a voltage is obtained from the main oscillator which is high when the pulse rate (determined by the position of foot pedal 28) is low and is low when the pulse rate is high. Preferably the pulse generator 24 is as shown in the application of Robert G. Klimo and Robert W. Artrip, entitled "Firing Control Oscillator for a Solid State Switch", Ser. No. 626,504, filed concurrently herewith and assigned to the assignee of the present application, the disclosure of which is incorporated herein by reference. Such pulse generator has included therein an operational amplifier, here designated by the reference numeral 76, whose output voltage varies inversely with the pulse rate of the generator.

The variable output of amplifier 76 (or other similarly varying voltage related to the pulse rate whatever pulse generator 24 may be used) is coupled, by resistor 77 and diode 78 to the junction of resistor 35 and the base of unijunction transistor 37. Thus, when the vehicle is operating at creep speed, and the output voltage of amplifier 76 is high, current will flow through resistor 77, diode 78, resistor 35 and timing capacitor 36, in addition to the normal charge current flowing through resistors 33 and 34 when capacitor 36 is charging. With the additional current coming from this added charge path through resistor 77, capacitor 36 will charge more rapidly to a voltage sufficient to turn transistor 37 on and the main SCR 19 will be commutated more rapidly. At higher vehicle speeds the output of operational amplifier 76 decreases and diode 78 is back-biased during most of the charging time of capacitor 36 so that at such time the normal commutation cycle is then effectively influenced by only the charge path through resistor 33.

What is claimed is:

1. In a system for controlling the power delivered to a load from a source of direct current and including a main silicon controlled rectifier through which load current can flow, a pulse generator for repeatedly gating the main silicon controlled rectifier into conduction at a controlled rate, a commutating capacitor which repeatedly charges to a commutating voltage, and a commutating silicon controlled rectifier which when gated into conduction will connect the commutating capacitor across the main silicon controlled rectifier, the improvement comprising:
   a. means responsive to conduction of said main slicon controlled rectifier for charging said commutating capacitor with said commutating voltage,
   b. means responsive to the presence of a commutating charge on said commutating capacitor for producing a regulated voltage,
   c. timing means actuated by said regulated voltage and having a time period,
   d. means responsive to actuation of said timing means for gating the commutation silicon controlled rectifier into conduction at the end of said time period.

2. In a system as set forth in claim 1, and further including means responsive to the commutation of said main silicon controlled rectifier for resetting said timing means.

3. In a system as set forth in claim 1, wherein said timer means includes a resistor and a timing capacitor connected in series across said regulated voltage, and said means (d) gates on said commutating silicon controlled rectifier when said timing capacitor charges to a predetermined level.

4. In a system as set forth in claim 3, wherein said means (d) includes a transistor which turns on in response to a predetermined level of charge on said timing capacitor and means for gating said commutation silicon controlled rectifier into conduction in response to the turning on of said transistor.

5. In a system as set forth in claim 4, and further including means responsive to the commutation of said main silicon controlled rectifier for discharging said timing capacitor.

6. In a system as set forth in claim 1 and wherein the load is a series-connected direct current motor and wherein the system includes means for reversing the connection of the field to the armature during rotation of the armature so that plug current can be generated, the improvement further comprising:
means responsive to the presence of plug current for decreasing the time period of said timing means.

7. In a system as set forth in claim 3 and wherein the load is a series-connected direct current motor and wherein the system includes means for reversing the connection of the field to the armature during rotation of the armature so that plug current can be generated, the improvement further comprising:
e. means responsive to the presence of plug current for developing a high voltage,
f. a second resistor connected from said high voltage to said timing capacitor whereby charging current can also flow through said second resistor to said timing capacitor during plugging.

8. In a system as set forth in claim 1 and further comprising means responsive to a low rate of gating the main silicon controlled rectifier into conduction for decreasing the time period of said timing means.

9. In a system as set forth in claim 3 and further comprising:
e. means for developing a high voltage when the rate of gating the main silicon controlled rectifier into conduction is low,
f. a second resistor connected from said high voltage to said timing capacitor whereby charging current can also flow through said second resistor to said timing capacitor when said gating rate is low.

10. In a system as set forth in claim 1 and wherein the load is a series-connected direct current motor and wherein the system includes means for reversing the connection of the field to the armature during rotation of said armature so that plug current can be generated, the improvement further comprising:
e. means responsive to the presence of plug current for decreasing the time period of said timing means,
f. means responsive to a low rate of gating the main silicon controlled rectifier into conduction for decreasing the time period of said timing means.

11. In a system as set forth in claim 10, wherein said means (a) charges said commutating capacitor to a commutating voltage proportional to the current through said main silicon controlled rectifier, the improvement further comprising:
g. means responsive to the instantaneous level of voltage on said commutating capacitor for decreasing the time period of said timing means if, and as soon as, the instantaneous level of voltage on said commutating capacitor exceeds a predetermined value.

12. In a system as set forth in claim 3 and wherein the load is a series-connected direct current motor and wherein the system includes means for reversing the connection of the field to the armature during rotation of said armature so that plug current can be generated, the improvement further comprising:
e. means responsive to the presence of plug current for developing a high voltage,
f. a second resistor connected from said high voltage developed by said means (e) to said timing capacitor whereby charging current can also flow through said second resistor to said timing capacitor during plugging,
g. means for developing a high voltage when the rate of gating the main silicon controlled rectifier into conduction is low,
h. a third resistor connected from said high voltage developed by said means (g) to said timing capacitor whereby charging current can also flow through said third resistor to said timing capacitor when said gating rate is low.

13. In a system as set forth in claim 12, wherein said means (a) charges said commutating capacitor to a commutating voltage proportional to the current through said main silicon controlled rectifier, and further including:
i. means for generating a first signal proportional to the level of charge on said commutating capacitor,
j. means for generating a fixed reference signal,
k. means for comparing said signals and for developing a high voltage if, and as soon as, the level of said first signal exceeds the reference signal,
l. means connecting said high voltage developed by said means (k) to said timing capacitor whereby charging current can also flow from said high voltage to said timing capacitor when the level of said first signal exceeds said reference signal.

14. In a system as set forth in claim 1, wherein said means (a) charges said commutating capacitor to a commutating voltage proportional to the current through said main silicon controlled rectifier, and further including:
e. means responsive to the instantaneous level of voltage on said commutating capacitor for decreasing the time period of said timing means if, and as soon as, the instantaneous level of voltage on said commutating capacitor exceeds a predetermined value.

15. In a system as set forth in claim 3, wherein said means (a) charges said commutating capacitor to a commutating voltage proportional to the current through said main silicon controlled rectifier, the improvement further comprising:
e. means responsive to the instantaneous level of voltage on said commutating capacitor for increasing the flow of current through said timing capacitor if, and as soon as, the instantaneous level of voltage on said commutating capacitor exceeds a predetermined value.

16. In a system as set forth in claim 3, wherein said means (a) charges said commutating capacitor to a commutating voltage proportional to the current through said main silicon controlled rectifier, and further including:
e. means for generating a first signal proportional to the level of charge on said commutating capacitor,
f. means for generating a fixed reference signal, g. means for comparing said signals and for developing a high voltage if, and as soon as, the level of said first signal exceeds the reference signal, h. means connecting said high voltage developed by said means (g) to said timing capcitor whereby charging current can also flow from said high voltage to said timing capacitor when the level of said first signal exceeds said reference signal.

17. In a system for controlling the power delivered to a load from a source of direct current and including a main silicon controlled rectifier through which load current can flow, a pulse generator for repeatedly gating the main silicon controlled rectifier into conduction at a controlled rate, a commutating capcitor which repeatedly charges to a commutating voltage, and a commutating silicon controlled rectifier which when gated into conduction will connect the commutating capacitor across the main silicon controlled rectifier, the improvement comprising:

a. means responsive to conduction of said main silicon controlled rectifier for charging said commutating capacitor to a commutating voltage proportional to the level of current through said main silicon controlled rectifier, b. pulse generator means for normally gating said commutating silicon controlled rectifier into conduction a predetermined time after said main silicon controlled rectifier is gated into conduction, c. means for detecting the level of commutating voltage on said commutating capacitor during the charging thereof, d. means responsive to said detecting means for causing said pulse generator means (b) to shorten said predetermined time whereby said commutating silicon controlled rectifier is gated into conduction prior to said predetermined time if, and as soon as, the commutating charge on said commutating capacitor rises to a predetermined level.

18. In a system as set forth in claim 17 wherein said means (c) includes means for generating a voltage signal proportional to the level of commutating charge on said commutating capacitor during the charging thereof, means for generating a reference voltage, and comparator means for comparing said signals.

19. In a system for controlling the power delivered to a load from a source of direct current and including a main silicon controlled rectifier through which load current can flow, a main pulse generator for repeatedly gating said main silicon controlled rectifier into conduction at a controlled rate, a commutating capacitor which repeatedly charges to a commutating voltage, and a commutating silicon controlled rectifier which when gated into conduction will connect the commutating capacitor across the main silicon controlled rectifier, the improvement comprising:

a. means responsive to conduction of said main silicon controlled rectifier for charging said commutating capacitor to a commutating voltage proportional to the level of current through said main silicon controlled rectifier, b. a timing capacitor and a resistor connected in series, c. means for causing a charging current to flow through said timing capacitor and said resistor, d. pulse generator means for gating said commutating silicon controlled rectifier into conduction when the level of charge on said timing capacitor has increased to a predetermined value, e. means for detecting the level of commutating voltage on said commutating capacitor during the charging thereof and for causing an increase in charging current to flow through said timing capacitor if, and as soon as, the voltage level on said commutating capactor exceeds a predetermined value.

20. In a system as set forth in claim 19, wherein said means (e) comprises:

means for generating a first signal proportional to the level of charge on said commutating capcitor, means for generating a fixed reference signal, means for comparing said signal and for developing a high voltage if, and as soon as, the level of said first signal exceeds the reference signal, a second resistor connected from said high voltage to said timing capacitor.

* * * * *

UNITED STATES PATENT OFFICE
CERTIFICATE OF CORRECTION

Patent No. 4,032,825              Dated June 28, 1977

Inventor(s) Robert G. Klimo

It is certified that error appears in the above-identified patent and that said Letters Patent are hereby corrected as shown below:

On the title page, after "Assignee:" -- "Cleveland Machine Controls, Inc., Cleveland, Ohio" should read --Towmotor Corporation, Mentor, Ohio--.

Column 9, line 5    - "capcitor" should read --capacitor--.

Column 9, line 14   - "capcitor" should read --capacitor--.

Column 10, line 32  - "capactor" should read --capacitor--.

Column 10, line 37  - "capcitor" should read --capacitor--.

Signed and Sealed this

Sixth Day of June 1978

[SEAL]

Attest:

RUTH C. MASON
*Attesting Officer*

DONALD W. BANNER
*Commissioner of Patents and Trademarks*